(12) United States Patent
Vernon

(10) Patent No.: US 11,073,819 B2
(45) Date of Patent: *Jul. 27, 2021

(54) SYSTEM, METHOD, AND COMPUTER PROGRAM FOR CREATING GEOMETRY-COMPLIANT LATTICE STRUCTURES

(71) Applicant: HONEYWELL FEDERAL MANUFACTURING & TECHNOLOGIES, LLC, Kansas City, MO (US)

(72) Inventor: Gregory John Vernon, Kansas City, MO (US)

(73) Assignee: Honeywell Federal Manufacturing & Technologies, LLC, Kansas City, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/865,729

(22) Filed: May 4, 2020

(65) Prior Publication Data

US 2020/0264586 A1 Aug. 20, 2020

Related U.S. Application Data

(63) Continuation of application No. 16/366,690, filed on Mar. 27, 2019, now Pat. No. 10,642,253, which is a continuation of application No. 14/997,238, filed on Jan. 15, 2016, now Pat. No. 10,274,935.

(51) Int. Cl.
*G05B 19/4099* (2006.01)
*B29C 64/386* (2017.01)
*B33Y 50/02* (2015.01)

(52) U.S. Cl.
CPC ........ *G05B 19/4099* (2013.01); *B29C 64/386* (2017.08); *B33Y 50/02* (2014.12); *G05B 2219/35134* (2013.01); *G05B 2219/49007* (2013.01); *Y02P 90/02* (2015.11)

(58) Field of Classification Search
CPC ........... B29C 67/0088; G05B 19/4099; G05B 2229/35134; G05B 2219/49007; B33Y 50/04
See application file for complete search history.

(56) References Cited

U.S. PATENT DOCUMENTS

| 5,946,479 | A | * | 8/1999 | Sakaguchi | ............ G06F 17/10 703/1 |
| 10,642,253 | B2 | * | 5/2020 | Vernon | ............ G05B 19/4099 |
| 2016/0179984 | A1 | * | 6/2016 | Chen-Keat | ............ G06F 30/23 703/1 |

\* cited by examiner

*Primary Examiner* — Phuc T Dang
(74) *Attorney, Agent, or Firm* — Hovey Williams LLP

(57) ABSTRACT

A system and method of creating a shape-conforming lattice structure for a part formed via additive manufacturing. The method includes receiving a computer model of the part and generating a finite element mesh. A lattice structure including a number of lattice cellular components may also be generated. Some of the mesh elements of the finite element mesh may be deformed so that the finite element mesh conforms to the overall shape of the part. The lattice structure may then be deformed so that the lattice structure has a cellular periodicity corresponding to the finite elements of the finite element mesh. In this way, the part retains the benefits of its overall shape and the benefits of lattice features without introducing structural weak points, directional stresses, and other structural deficiencies.

20 Claims, 8 Drawing Sheets

SYSTEM, METHOD, AND COMPUTER PROGRAM FOR CREATING GEOMETRY-COMPLIANT LATTICE STRUCTURES

RELATED APPLICATIONS

This application is a continuation application, and claims priority benefit with regards to common subject matter, of non-provisional U.S. patent application Ser. No. 16/366,690, filed Mar. 27, 2019, entitled SYSTEM, METHOD, AND COMPUTER PROGRAM FOR CREATING GEOMETRY-COMPLIANT LATTICE STRUCTURES, issued as U.S. Pat. No. 10,642,253 on May 5, 2020. Application Ser. No. 16/366,690 claims priority benefit of non-provisional U.S. patent application Ser. No. 14/997,238, filed Jan. 15, 2016, entitled SYSTEM, METHOD, AND COMPUTER PROGRAM FOR CREATING GEOMETRY-COMPLIANT LATTICE STRUCTURES, issued as U.S. Pat. No. 10,274,935 on Apr. 30, 2019. The above-referenced patent applications and patents are hereby incorporated by reference into the present application in their entireties.

STATEMENT REGARDING FEDERALLY-SPONSORED RESEARCH OR DEVELOPMENT

This invention was made with Government support under Contract No.: DE-NA0000622 awarded by the United States Department of Energy/National Nuclear Security Administration. The Government has certain rights in the invention.

BACKGROUND

Additive manufacturing is often used for creating prototypes and unique, complex, and/or low-production parts. Such parts are often formed with lattice structures for improving structural rigidity without significantly increasing weight of the parts. However, these lattice structures are often truncated when overall shapes of the lattice structures do not match overall shapes of the parts. For example, an orthogonal lattice structure may be cropped to fit a part having a circular overall shape. Some of the cropped cellular components of the orthogonal lattice structure become structurally compromised as a result, which may introduce undesired stress paths and stress concentrations. Truncating and/or cropping cellular components may also introduce unwanted artifacts in the computer model of the part, which may complicate the additive manufacturing process.

SUMMARY OF THE INVENTION

Embodiments of the present invention solve the above-mentioned problems and provide a distinct advance in the art of additive manufacturing. More particularly, the present invention provides a computer modeling and additive manufacturing system for creating a shape-conforming lattice structure of a part formed via additive manufacturing.

An embodiment of the present invention is a method of creating a shape-conforming lattice structure including receiving a computer model of a part and generating a finite element mesh corresponding to an overall shape of the part. A lattice structure including a number of lattice cellular components may also be generated. The lattice structure may then be deformed so that the lattice structure has a cellular periodicity corresponding to the mesh elements of the finite element mesh. In this way, the part retains its overall shape and receives the benefits of lattice features without introducing structural weak points, unintentional stress paths, and other structural deficiencies.

Another embodiment of the present invention is another method of creating a shape-conforming lattice structure including generating a computer model of a part and generating a finite element mesh corresponding to the computer model of the part. A lattice structure including a number of lattice cellular components may also be generated. The mesh elements of the finite element mesh may be free-form deformed so that the finite element mesh conforms to the overall shape of the part. The lattice structure may then be deformed so that the lattice structure has a cellular periodicity corresponding to the mesh elements of the finite element mesh. Each individual mesh element, when all mesh generation and modification is complete, may be independent from all other mesh elements in the finite element mesh. This enables parallel processing of the deformed lattice structure. In some embodiments, each individual mesh element could be assigned a reduced-order model based on its deformed lattice structure which may reduce a later simulation of the entire part.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
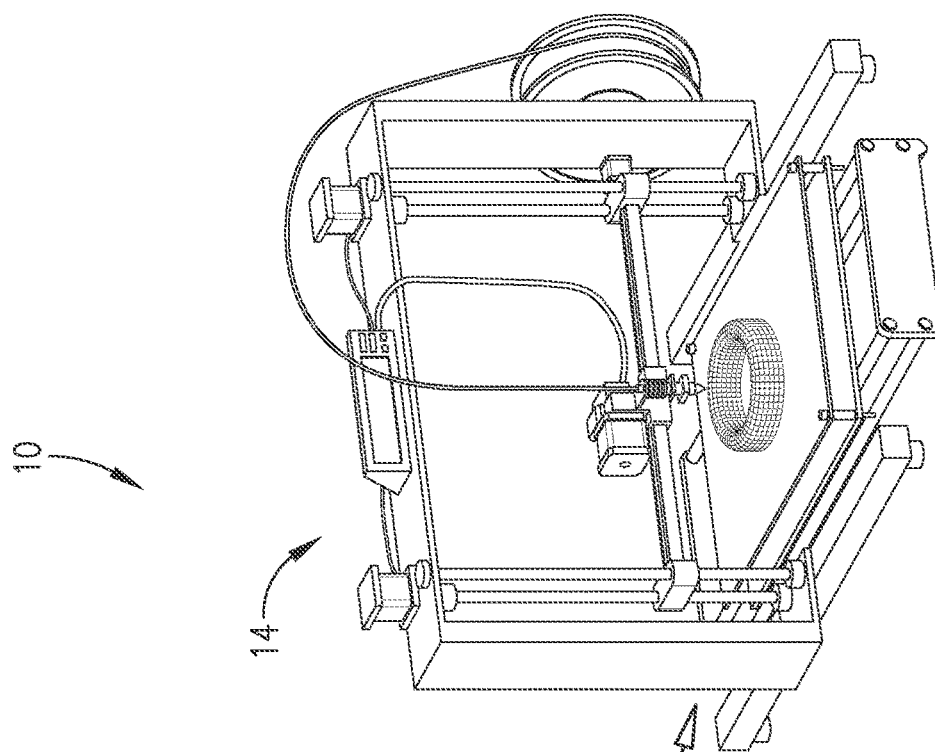
FIG. 1 is a perspective view of a computer modeling and additive manufacturing system constructed in accordance with an embodiment of the present invention.
Figure 1:
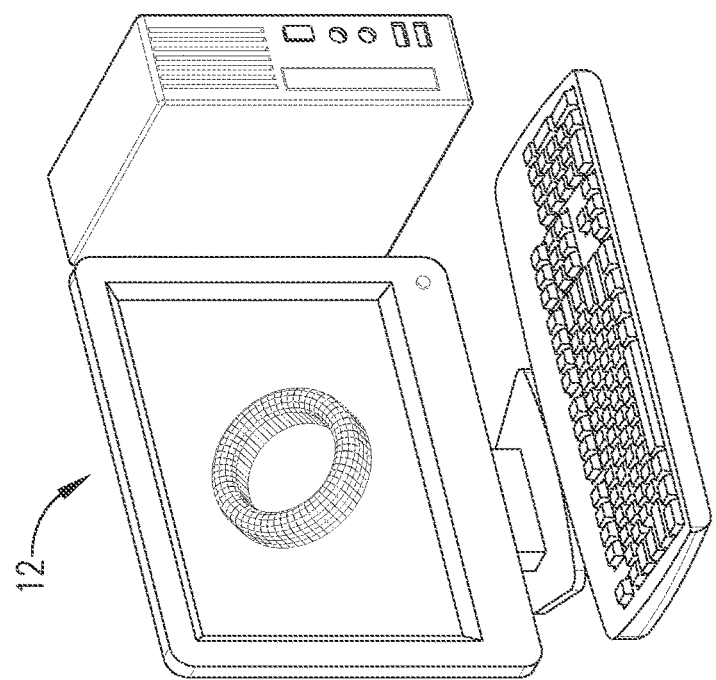

The drawing figures do not limit the present invention to the specific embodiments disclosed and described herein.

The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
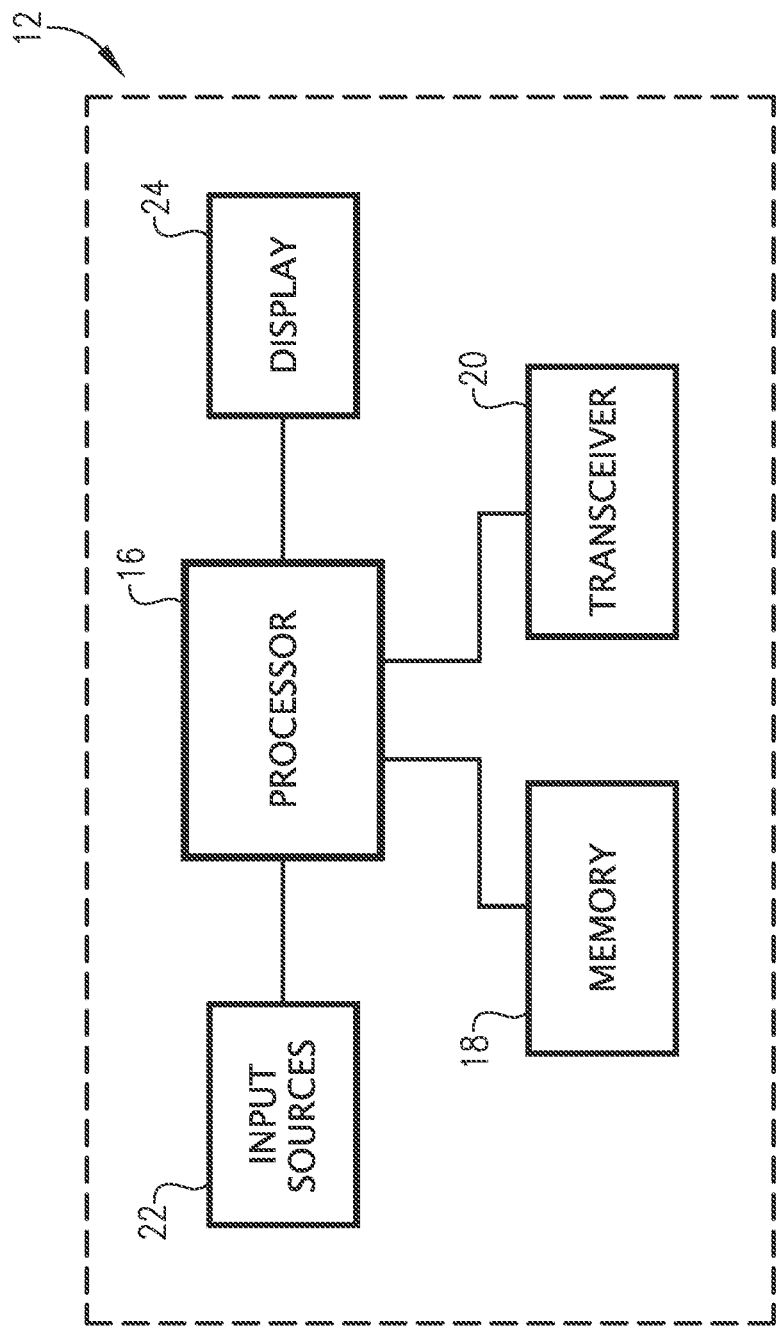
FIG. 2 is a schematic view of the computer modeling system of FIG. 1.
Figure 3:
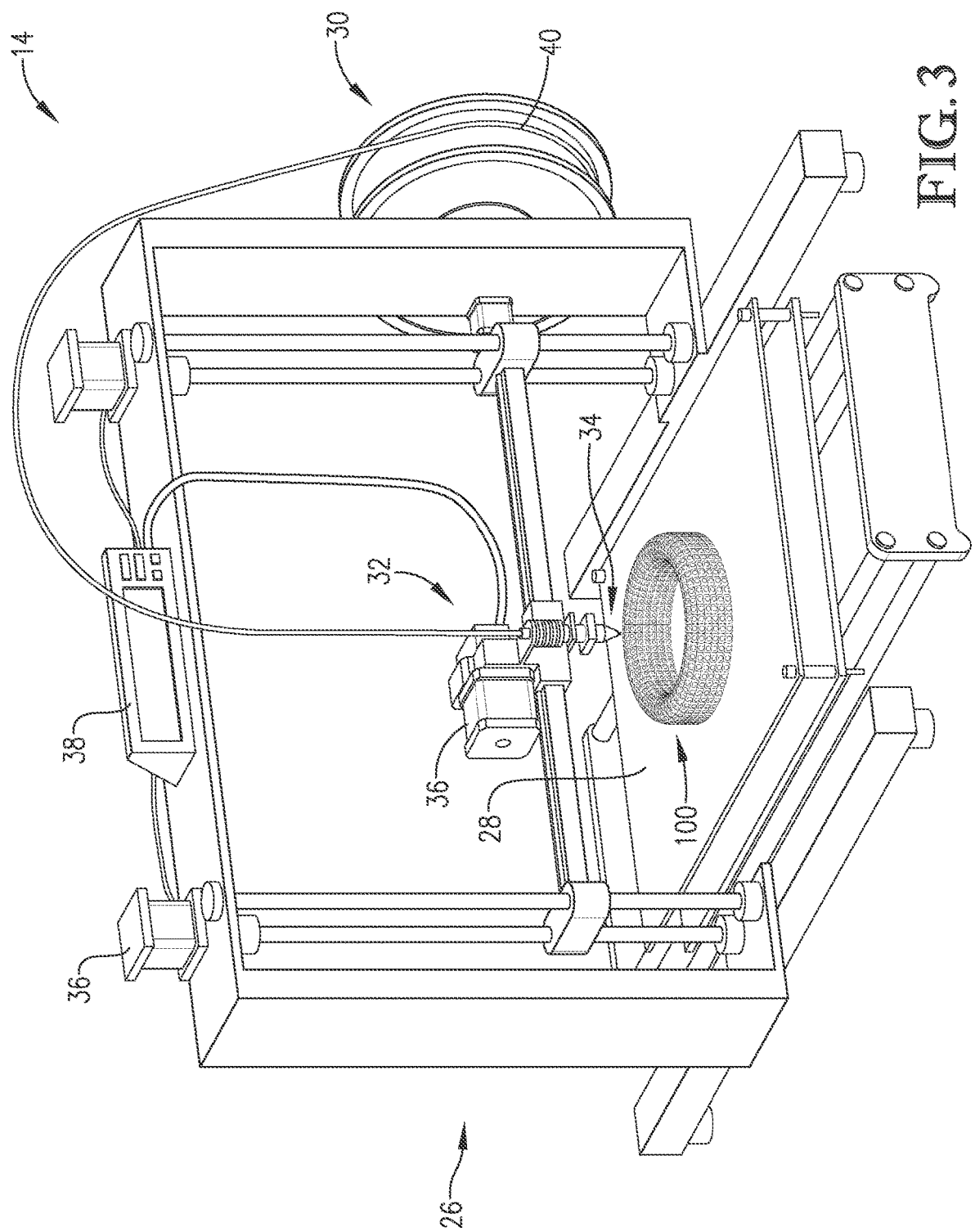
FIG. 3 is a perspective view of the additive manufacturing system of FIG. 1.
Figure 5:
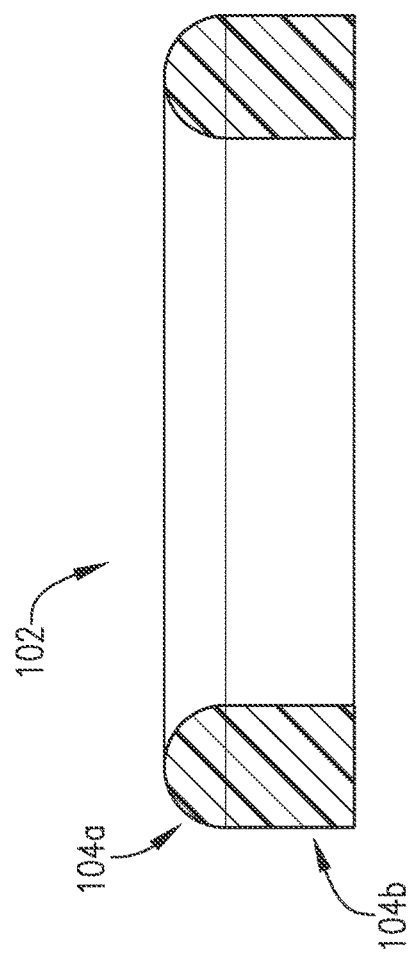
FIG. 5 is an elevational cutaway view of the overall shape of FIG. 4.
Figure 4:
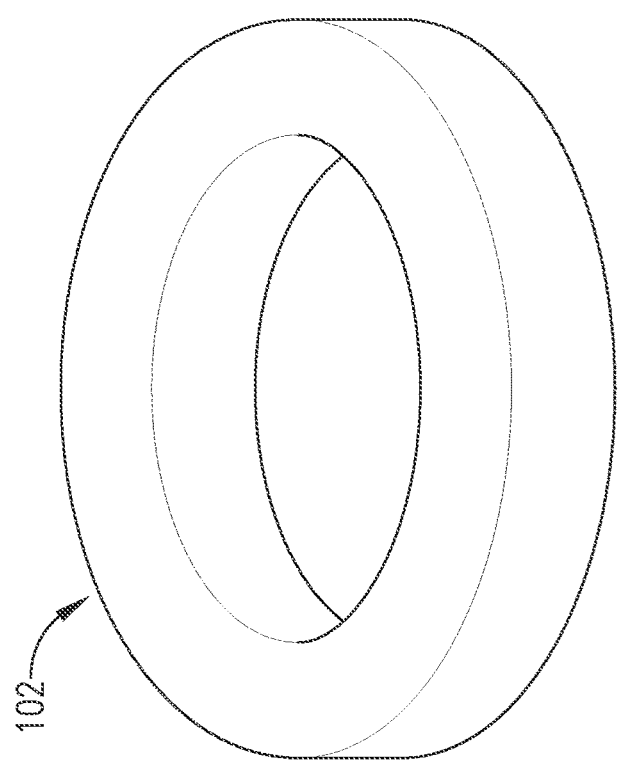
FIG. 4 is a perspective view of an overall shape of a part modeled via the computer modeling system of FIG. 1.

Turning to the drawing figures, and particularly FIGS. 1-3, a computer modeling and additive manufacturing system 10 constructed in accordance with an embodiment of the present invention is illustrated. The computer modeling and additive manufacturing system 10 broadly comprises a computer aided design (CAD) system 12 and an additive manufacturing system 14.

The CAD system 12 may be used for designing and generating a computer model of a part 100 and broadly includes a processor 16, a memory 18, a transceiver 20, a plurality of inputs 22, and a display 24. The CAD system 12 may be integral with or separate from the additive manufacturing system 14.

The processor 16 generates the computer model of the part 100 according to inputs and data received from a user. The processor 16 may include a circuit board, memory, display, inputs, and/or other electronic components such as a transceiver or external connection for communicating with external computers and the like.

The processor 16 may implement aspects of the present invention with one or more computer programs stored in or on computer-readable medium residing on or accessible by the processor. Each computer program preferably comprises an ordered listing of executable instructions for implementing logical functions in the processor 16. Each computer program can be embodied in any non-transitory computer-readable medium, such as the memory 18 (described below), for use by or in connection with an instruction execution system, apparatus, or device, such as a computer-based system, processor-containing system, or other system that can fetch the instructions from the instruction execution system, apparatus, or device, and execute the instructions.

The memory 18 may be any computer-readable non-transitory medium that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The transceiver 20 may transmit data and instructions between the CAD system 12 and the additive manufacturing system 14 over a wireless communication network. Alternatively, a wired or integrated setup may be used between the CAD system 12 and the additive manufacturing system 14.

The inputs 22 allow a user to design and modify a model of the part 100 and may comprise a keyboard, mouse, trackball, touchscreen, buttons, dials, virtual inputs, and/or a virtual reality simulator. The inputs 22 may also be used to control or instruct the additive manufacturing system 14.

The display 24 may display a two-dimensional or three-dimensional representation of the model and may also display model data, computer options, and other information via a graphical user interface (GUI). The display 24 may be separate from or integrated with the additive manufacturing system 14.

The additive manufacturing system 14 produces prototypes and parts such as part 100 and broadly includes a frame 26, a support surface 28, a material reserve 30, a feeder 32, a material applicator 34, a set of motors 36, and a processor 38. The additive manufacturing system 14 may be integral with or separate from the powder coating system 14.

The frame 26 provides structure for the support surface 28, material reserve 30, feeder 32, material applicator 34, motors 36, and/or the processor 38 and may include a base, vertical members, cross members, and mounting points for mounting the above components thereto. Alternatively, the frame 26 may be a walled housing or similar structure.

The support surface 28 supports the part 100 as it is being constructed and may be a stationary or movable flat tray or bed, a substrate, a mandrel, a wheel, scaffolding, or similar support. The support surface 28 may be integral with the additive manufacturing system 14 or may be removable and transferable with the part 100 as the part 100 is being constructed.

The material reserve 30 retains additive manufacturing material 40 and may be a hopper, tank, cartridge, container, spool, or other similar material holder. The material reserve may be integral with the additive manufacturing system 14 or may be disposable and/or reusable.

The additive manufacturing material 40 may be used for forming part 100 and may be in pellet or powder form, filament or spooled form, or any other suitable form. The additive manufacturing material 40 may be any plastic, polymer, or organic material suitable for use in additive manufacturing. For example, the additive manufacturing material 40 may be acrylonitrile butadiene styrene (ABS), polyamide, straw-based plastic, or other similar material.

The feeder 32 directs the additive manufacturing material 40 to the material applicator 34 and may be a spool feeder, a pump, an auger, or any other suitable feeder. Alternatively, the additive manufacturing material 40 may be gravity fed to the material applicator 34.

The material applicator 34 deposits the additive manufacturing material 40 onto the support surface 28 and previously constructed layers. The material applicator 34 may include a nozzle, guide, sprayer, or other similar component for channeling the additive manufacturing material 40 and a laser, heater, or similar component for melting the additive manufacturing material and bonding (e.g., sintering) the additive manufacturing material 40 onto a previously constructed layer. The material applicator 34 may be sized according to the size of the pellets, powder, or filament being deposited.

The motors 36 position the material applicator 34 over the support surface 28 and previously constructed layers and move the material applicator 34 as the additive manufacturing material is deposited onto the support surface 28 and the previously constructed layers. The motors 36 may be oriented orthogonally to each other so that a first one of the motors 36 is configured to move the material applicator 34 in a lateral "x" direction, a second one of the motors 36 is configured to move the material applicator 34 in a longitudinal "y" direction, and a third one of the motors 36 is configured to move the material applicator 34 in an altitudinal "z" direction. Alternatively, the motors 36 may move the support surface 28 (and hence the part 100) while the material applicator 34 remains stationary.

The processor 38 directs the material applicator 34 via the motors 36 and activates the material applicator 34 such that the material applicator 34 deposits the additive manufacturing material 40 onto the support surface 28 and previously constructed layers according to a computer aided design of the part. The processor 38 may include a circuit board, memory, display, inputs, and/or other electronic components such as a transceiver or external connection for communicating with the processor 16 of the CAD system 12 and other external computers. It will be understood that the processor 38 may be one and the same as processor 16 of the CAD system 12.

The processor 38 may implement aspects of the present invention with one or more computer programs stored in or on computer-readable medium residing on or accessible by the processor. Each computer program preferably comprises an ordered listing of executable instructions for implementing logical functions in the processor 38. Each computer program can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory means that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

It will be understood that the additive manufacturing system 14 may be any type of additive manufacturing or "3D printing" system such as a sintering, laser melting, laser sintering, extruding, fusing, stereolithography, extrusion, light polymerizing, powder bed, wire additive, or laminated object manufacturing system. The additive manufacturing system 14 may also be a hybrid system that combines additive manufacturing with molding, scaffolding, and/or other subtractive manufacturing or assembly techniques.

Figure 12:
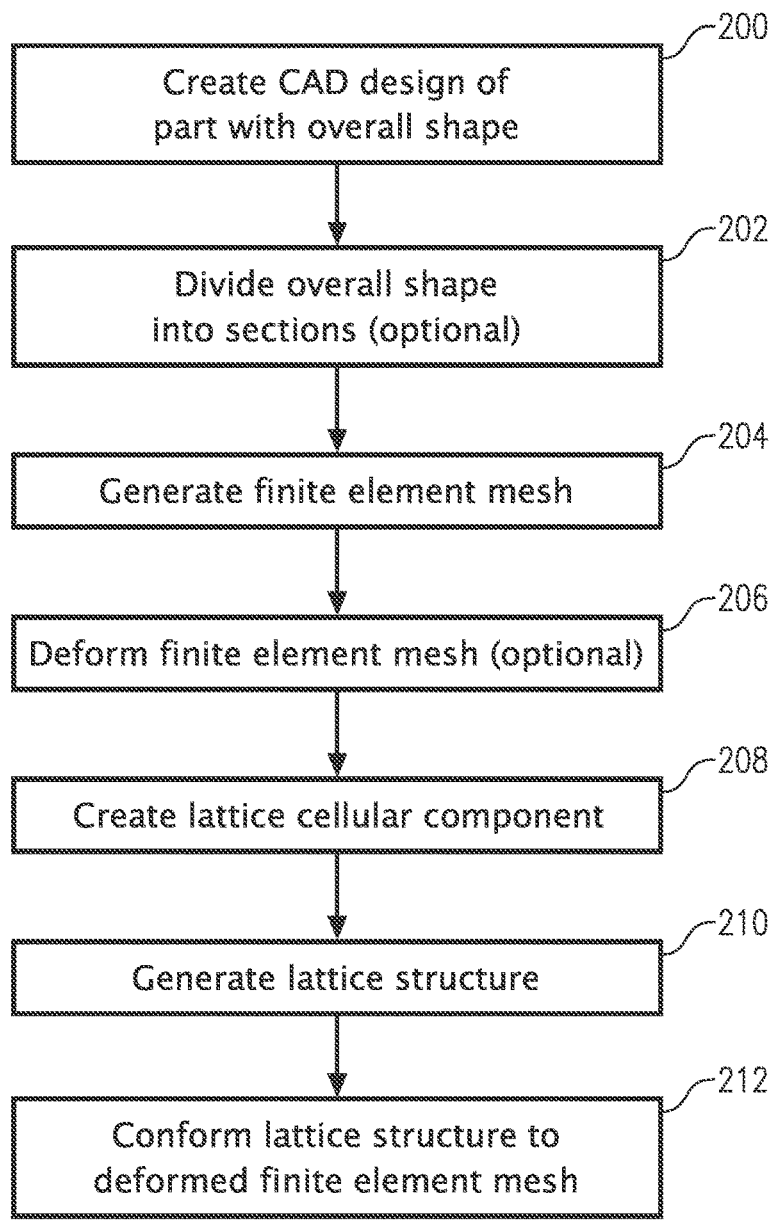
FIG. 12 is a flow diagram of a method of creating a part design via the computer modeling system of FIG. 2.
Figure 13:
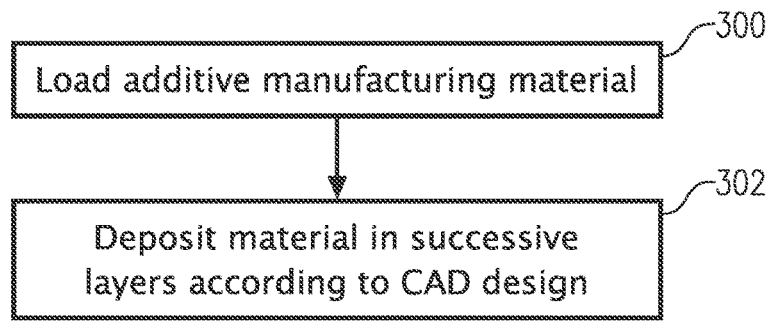
FIG. 13 is a flow diagram of a method of forming the part of FIG. 10 via the additive manufacturing system of FIG. 3.

Turning to FIGS. 12 and 13, and with reference to FIGS. 4-11, use of the computer modeling and additive manufacturing system 10 for creating a computer model of the part 100 and forming the part 100 via additive manufacturing according to the computer model will now be described in more detail. First, a computer-aided model may be created (or received from another computer system), in which an overall shape 102 of the part 100 (FIG. 4) may be generated, as shown in block 200 of FIG. 12. This may be a wire-frame model, surface model, solid model, or any other suitable CAD model that defines or exhibits the overall shape 102 of the part 100.

The overall shape 102 of the part 100 may optionally be divided into two or more sections 104a,b (FIG. 5), as shown in block 202. One or more of the sections 104a,b may encompass a portion of the part 100 that will only be subjected to basic lattice deformations. For example, section 104b may include lattice cellular components that that will be deformed only via basic lattice deformations such as translation, rotation, and/or isotropic, orthotropic, and anisotropic scaling to form the lower portion of the part. This may reduce or simplify calculations and rendering performed by the CAD system 12.

Figure 7:
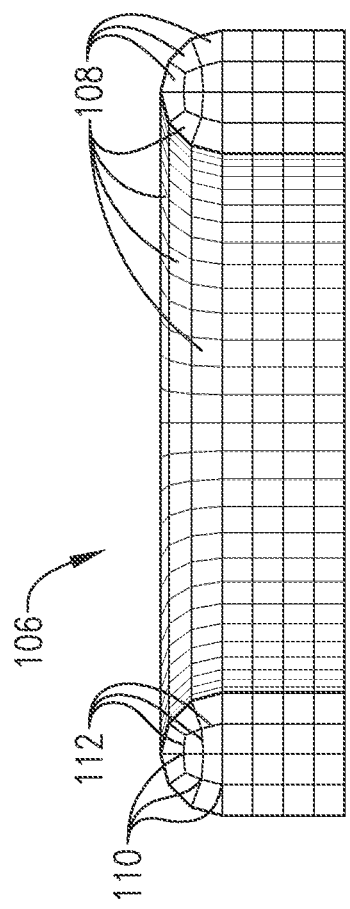
FIG. 7 is an elevational cutaway view of the finite element mesh of FIG. 6.
Figure 6:
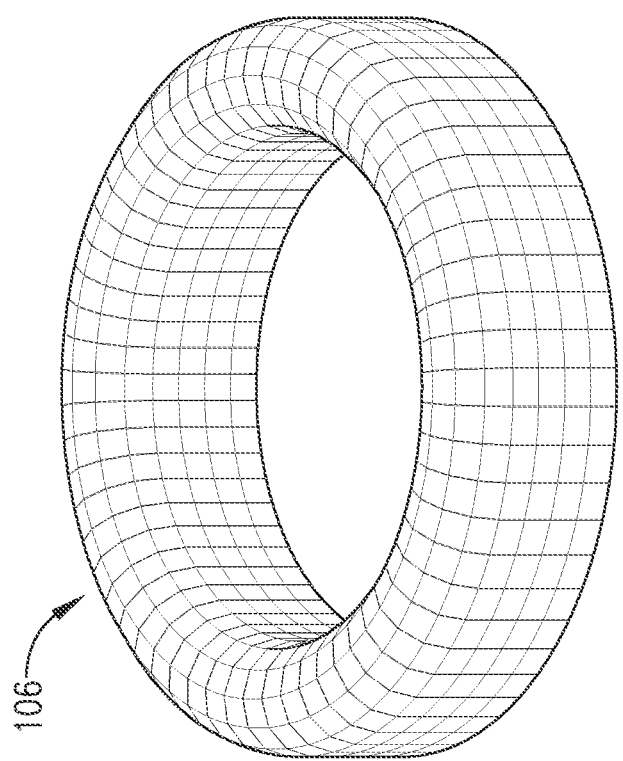
FIG. 6 is a finite element mesh of the overall shape of the part of FIG. 4.
Figure 9:
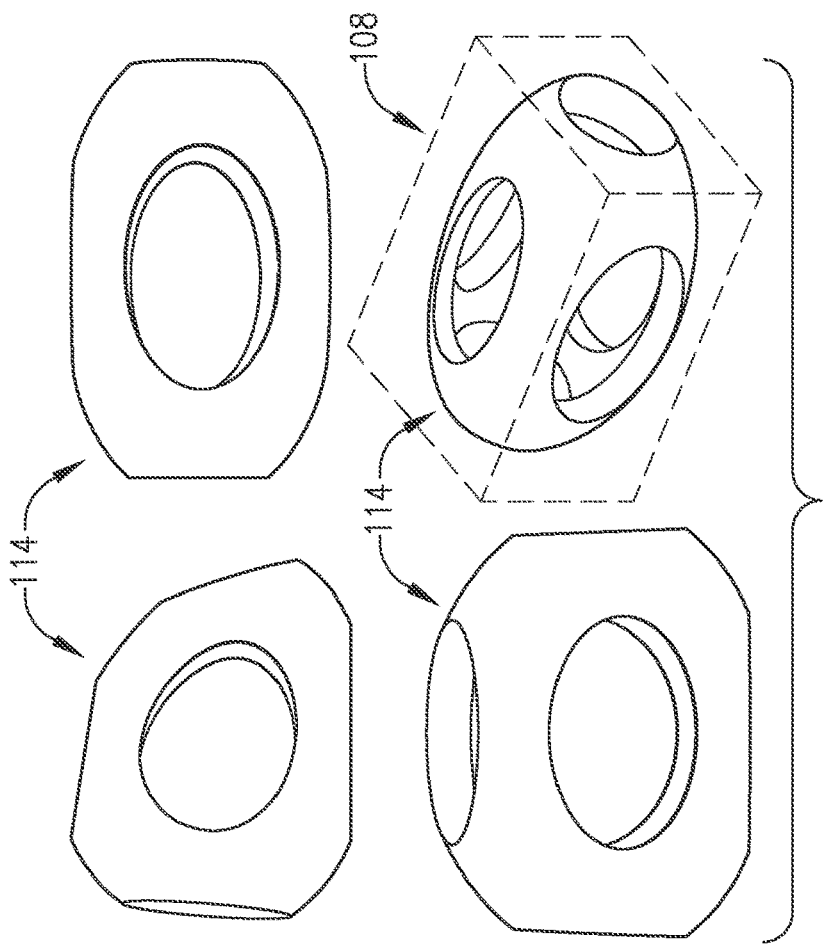
FIG. 9 is a perspective view of the lattice cellular component of FIG. 8 being deformed.
Figure 8:
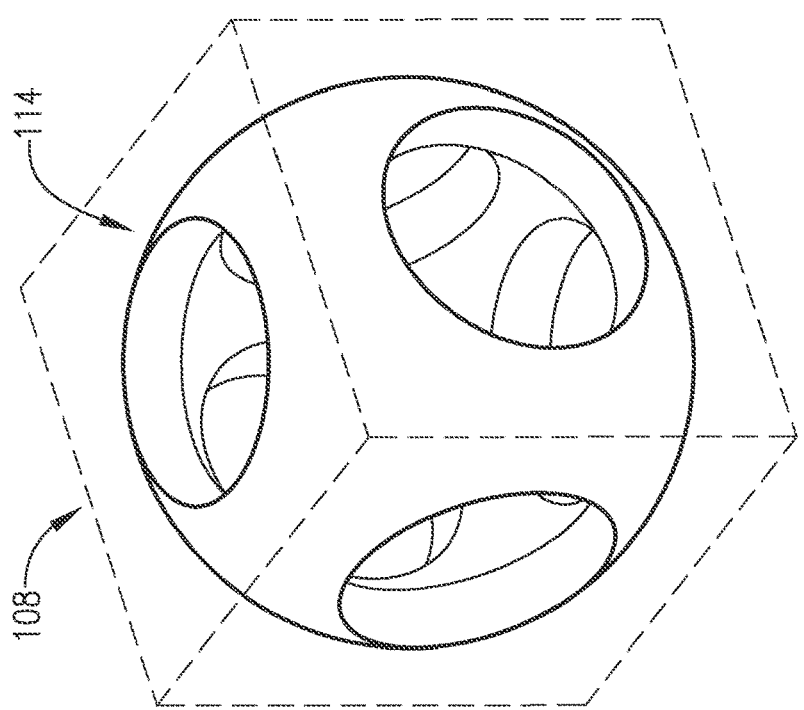
FIG. 8 is a perspective view of a lattice cellular component within a mesh element.
Figure 11:
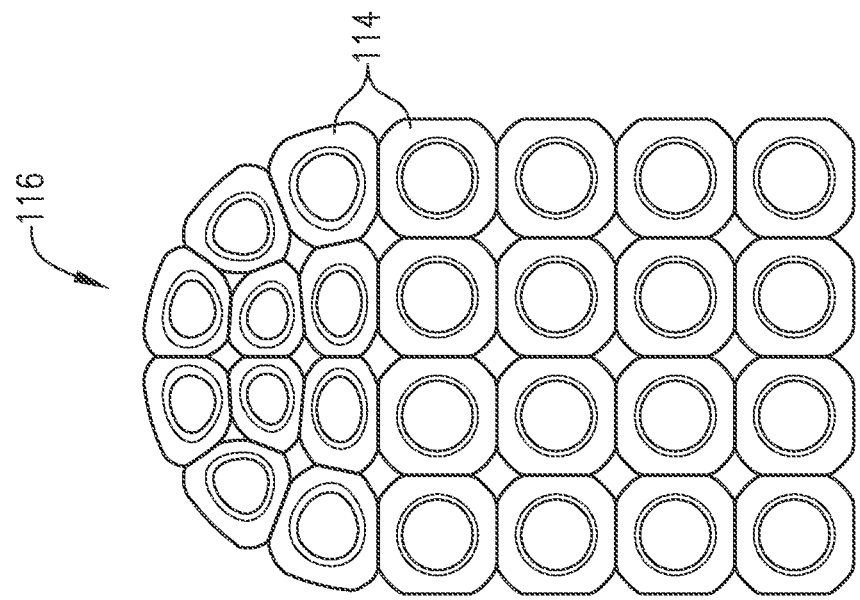
FIG. 11 is an elevational partial cutaway view of the lattice structure of FIG. 10.
Figure 10:
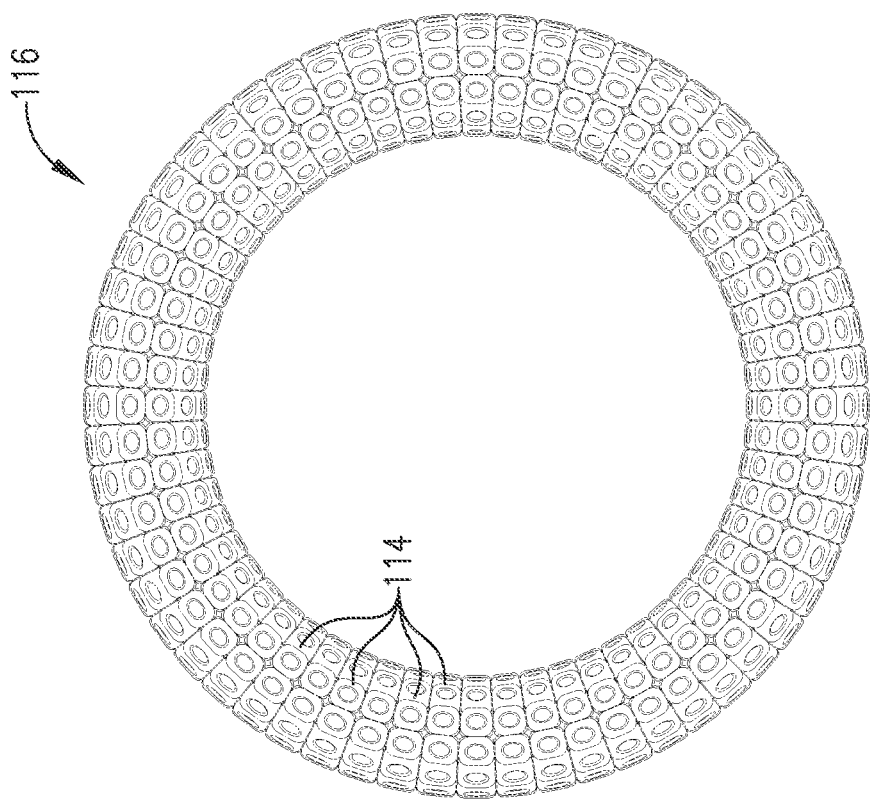
FIG. 10 is a top view of the part having a lattice structure based on the lattice cellular component of FIG. 8.

A finite element mesh 106 (shown fully deformed in FIGS. 6 and 7) may then be created, as shown in block 204. The finite element mesh 106 may include a plurality of mesh elements 108 each representing a deformable unit. Each mesh element 108 may have a number of corner nodes 110, a number of edge midpoint nodes 112, face midpoint nodes, volume midpoint nodes, and/or any other nodes forming the basis of mesh element 108 manipulation and deformation. For example, an 8-node hex will have corner nodes. A 20-node hex will have corner nodes and edge midpoint nodes. A 27-node hex will have corner nodes, edge midpoint nodes, face midpoint nodes, and a volume midpoint nodes. The finite element mesh 106 may be a first order, second order, or higher order finite element mesh 106 and may be triagonal, quadrilateral, tetrahedral, pyramidal, hexahedral, dodecahedral, or other polyhedral sub-volume shapes. The finite element mesh 106 thus includes sub-volumes (mesh elements 108) that provide spatial coordinates, as defined by the nodes for deformation processing. Higher order mesh elements 108 can be used for higher order interpolation. Interpolation can be a free-form deformation, an isogeometric shape function, or an isoparametric shape function. The finite element mesh 106 may include mesh elements of two or more base shapes. The finite element mesh 106 may be created to conform to and be compliant with the overall shape of the part (FIGS. 6 and 7). However, the finite element mesh 106 may undergo additional deformation, as described below.

The finite element mesh 106 may optionally undergo smoothing, Jacobian optimization, Laplace optimization, regularity optimization, or other deformations, as shown in block 206. The finite element mesh 106 may also be manually deformed or edited.

A lattice cellular component 114 (FIGS. 8 and 9) may then be created, as shown in block 208. The lattice cellular component 114 may be a repeatable structural unit for populating the lattice structure (described below) and may itself be a wire-frame model, surface model, solid model, or any other suitable CAD model. The lattice cellular component 114 may have a shape that coincides with the shape of the mesh elements 108 of the finite element mesh 106. For example, if the finite element mesh 106 is quadrilateral, the lattice cellular component 114 may also be quadrilateral and may extend to boundaries and/or nodes of a non-deformed mesh element 108. The lattice cellular component 114 may include truss members, cross members, frame-like members, or any other structural components and may have chamfers, fillets, recesses, arches, and complex curves. The lattice cellular component 114 may also include through-holes, channels, voids, chambers, and other negative spaces such that the resulting lattice structure is strong yet lightweight. This construction also simplifies and improves deformation of the lattice structure, as described below. The lattice cellular component 114 may be honeycomb shaped, cube shaped, tube shaped, or any other suitable base shape.

A lattice structure 116 (shown fully deformed in FIGS. 10 and 11) based on the lattice cellular component 114 may then be generated, as shown in block 210. Each component in the lattice structure 116 may correspond to a mesh element 108 of the finite element mesh 106. The lattice structure 116 may be a matrix, array, or network of repetitions or copies of the lattice cellular component 114. The lattice structure 116 may include a honeycomb pattern, tube pattern, cube pattern, or any other pattern. The pattern may extend along one or more axes. In some embodiments, the lattice structure 116 may include lattice cellular components of two or more different base shapes.

The lattice structure 116 may then be modified to conform to the deformed finite element mesh 106 such that the lattice structure 116 has a cellular periodicity corresponding to the mesh elements 108 of the finite element mesh 106, as shown in block 212. In this way, the lattice structure 116 conforms to the overall shape 102 of the part 100. In one embodiment, the lattice structure 116 may be sampled at various points along its surface or within its volume. The surface may be faceted, where each facet may be a polygon including vertices and edges. This faceted form may be stored as a stereolithography (STL) file, Polygon file (PLY) file, Additive Manufacturing file (AMF), or as a finite element mesh. The vertices then provide spatial coordinates for evaluating the deformed mesh elements 108 or lattice cellular components 114. Deformation of each lattice cellular component 114 may include rotation and translation, in addition to stretching and skewing. That is, a lattice cellular component may undergo global deformation without undergoing local deformation. Note that the part 100 may essentially be the above lattice structure 116 or may include a shell, housing, outer wall, mounting bosses, and other major features in addition to the lattice structure 116.

Turning to FIG. 13, and with reference to FIG. 3, the part 100 may then be created via the additive manufacturing system 14. First, the additive manufacturing material may be inserted in or positioned on the material reserve 20 of the additive manufacturing system 14, as shown in block 300. For example, a spool of the additive manufacturing material 40 may be loaded onto the additive manufacturing system 14.

The additive manufacturing material 40 may then be deposited onto the support surface 28 via the material applicator 34 in successive layers according to the computer-aided design of the part 100, as shown in block 302. To that end, activation of horizontally oriented motors in various amounts allows for diagonal movement and curved movement of the material applicator 34. Activation of a vertically oriented motor may be used for relocating the material applicator 34 without depositing material and/or raising the material applicator 34 for creation of a new layer (see motors 36, above).

It will be understood that the above-described steps may be performed in any order, including simultaneously. In addition, some of the steps may be repeated, duplicated, and/or omitted without departing from the scope of the present invention.

The above-described computer modeling and additive manufacturing system 10 and method provide several advantages over conventional systems. For example, features of the lattice structure 116 are not cut or compromised to form the overall shape 102 of the part 100. This eliminates structural weak points, stress concentrations, and inefficient or imperfect structural properties. For example, an axially symmetric part would be expected to have axially symmetric structural properties. However, if the axially symmetric part is formed of an orthogonal lattice structure, stress concentrations will form where the orthogonal lattice structure is truncated to form the overall shape of the axially symmetric part. The computer modeling and additive manufacturing system 10 eliminates this problem. The arrangement, size, and shape distribution of the lattice cellular components 114 may also be modified. Each mesh element 108 of the finite element mesh 106 may be recognized as a valid mesh element 108 by the software. As such, the physical properties of each modified lattice cellular component 114 can be used to apply a reduced-order model to the parent mesh elements 108 of the modified lattice cellular components 114 so as to reduce the computational complexity of a subsequent simulation. The CAD system 12 may also be used for analyzing and iteratively improving and optimizing the lattice structure 116.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of creating a lattice structure for a part formed via additive manufacturing, the method comprising the steps of:
    generating a finite element mesh corresponding to an overall shape of the part via a processor, the finite element mesh having a plurality of mesh elements, at least some of the plurality of mesh elements being at least second order;
    generating a lattice cellular component via the processor, the lattice cellular component corresponding to a mesh element of the finite element mesh;
    generating a lattice structure based on the lattice cellular component via the processor; and
    deforming the lattice structure via the processor such that the lattice structure has a cellular periodicity corresponding to at least some of the plurality of mesh elements of the finite element mesh so that the lattice structure conforms to the overall shape of the part.

2. The method of claim 1, further comprising a step of interpolating at least some of the plurality of mesh elements.

3. The method of claim 2, wherein the step of interpolating the at least some of the plurality of mesh elements includes free-form deformation.

4. The method of claim 2, wherein the step of interpolating the at least some of the plurality of mesh elements includes isogeometric shape function interpolation.

5. The method of claim 2, wherein the step of interpolating the at least some of the plurality of mesh elements includes isoparametric shape function interpolation.

6. The method of claim 1, further comprising a step of smoothing at least some of the plurality of mesh elements.

7. The method of claim 1, further comprising a step of applying Jacobian optimization to at least some of the plurality of mesh elements.

8. The method of claim 1, further comprising a step of applying Laplace optimization to at least some of the plurality of mesh elements.

9. The method of claim 1, further comprising a step of applying regularity optimization to at least some of the plurality of mesh elements.

10. The method of claim 1, further comprising a step of manually deforming at least some of the plurality of mesh elements.

11. The method of claim 1, further comprising a step of free-form deforming at least some of the plurality of mesh elements.

12. The method of claim 1, wherein each finite element of the plurality of mesh elements includes a plurality of nodes, the step of conforming the lattice structure to the overall shape of the part further including shifting at least some nodes of the plurality of nodes.

13. The method of claim 12, wherein the at least some of the plurality of mesh elements are 27-node hexes.

14. The method of claim 1, wherein the at least some of the plurality of mesh elements are greater-than-second-order mesh elements.

15. The method of claim 1, wherein the plurality of mesh elements include mesh elements having at least two different base shapes.

16. A system for creating a part via additive manufacturing, the system comprising:
    a computer modeling system comprising:
        a processor configured to:
            generate a finite element mesh corresponding to an overall shape of the part, the finite element mesh having a plurality of mesh elements, at least some of the plurality of mesh elements being at least second order;
            generate a lattice cellular component according to inputs received from the user, the lattice cellular component corresponding to a mesh element of the finite element mesh;
            generate a lattice structure based on the lattice cellular component; and
            deform the lattice structure such that the lattice structure has a cellular periodicity corresponding to the mesh elements of the finite element mesh so that the lattice structure conforms to the overall shape of the part.

17. The system of claim 16, the processor being configured to apply Jacobian optimization to the at least some of the plurality of mesh elements.

18. The system of claim 16, the processor being configured to apply Laplace optimization to the at least some of the plurality of mesh elements.

19. The system of claim 16, the processor being configured to apply regularity optimization to the at least some of the plurality of mesh elements.

20. A method of creating a lattice structure for a part formed via additive manufacturing, the method comprising the steps of:
    dividing a computer model of the part into at least two sections via a processor, the computer model having an overall shape;
    generating a hexahedron finite element mesh corresponding to the at least two sections of the computer model of the part via the processor, the hexahedron finite element mesh having a plurality of mesh elements, at least some of the plurality of mesh elements being at least second order;
    generating a lattice cellular component via the processor, the lattice cellular component corresponding to a mesh element of the hexahedron finite element mesh;
    generating a lattice structure based on the lattice cellular component via the processor;
    interpolating at least some of the mesh elements of the hexahedron finite element mesh in one of the two sections according to at least one of free-form deformation, an isogeometric shape function, and an isoparametric shape function via the processor such that the hexahedron finite element mesh conforms to the overall shape of the part;
    optimizing at least some of the mesh elements of the hexahedron finite element mesh in one of the two sections according to at least one of Jacobian optimization, Laplace optimization, and regularity optimization via the processor; and
    deforming the lattice structure via the processor such that the lattice structure has a cellular periodicity corresponding to the mesh elements of the hexahedron finite element mesh so that the lattice structure conforms to the overall shape of the part.

* * * * *